United States Patent
Monpetit

[15] 3,672,345
[45] June 27, 1972

[54] ELECTRONIC INJECTION-CONTROLLING SYSTEM FOR INTERNAL COMBUSTION ENGINES

[72] Inventor: Louis A. Monpetit, L'Etang-la-Ville, France

[73] Assignee: Societe des Procedes Modernes d'Injection Sopromi, Les Mureaux, France

[22] Filed: April 2, 1970

[21] Appl. No.: 25,094

[52] U.S. Cl. ................................. 123/32 EA, 123/119 R
[51] Int. Cl. ........................... F02b 3/00, F02b 33/00
[58] Field of Search ................................. 123/32 E

[56] References Cited

UNITED STATES PATENTS

| | | | |
|---|---|---|---|
| 2,845,910 | 8/1958 | Pribble | 123/32 |
| 3,578,116 | 5/1971 | Nakajima | 123/97 B |
| 3,590,793 | 7/1971 | Masaki | 123/97 B |
| 2,859,738 | 11/1958 | Campbell | 123/32 E |
| 2,911,966 | 11/1959 | Pribble | 123/32 E |
| 2,936,744 | 5/1960 | Paule | 123/32 E |
| 2,981,246 | 4/1961 | Woodward | 123/32 E |
| 3,430,616 | 3/1969 | Glockler | 123/32 E |
| 3,456,628 | 7/1969 | Bassot | 123/32 E |
| 3,463,130 | 8/1969 | Reichardt | 123/32 E |
| 3,515,104 | 6/1970 | Reichardt | 123/32 E |

FOREIGN PATENTS OR APPLICATIONS

| | | | |
|---|---|---|---|
| 1,243,288 | 12/1959 | France | 123/32 E |
| 1,125,718 | 9/1957 | Germany | 123/32 E |
| 1,126,677 | 1/1960 | Germany | 123/32 E |

Primary Examiner—Laurence M. Goodridge
Assistant Examiner—Ronald B. Cox
Attorney—Kenyon Kenyon Reilly Carr & Chapin

[57] ABSTRACT

The injection controlling circuit in an internal combustion engine of a known type comprising a flip-flop controlled by the rotation of the engine so as to generate at predetermined moments injection-controlling signals, in association with a circuit producing end-of-injection signals in accordance with the operative parameters of the engine, means are provided to terminate the injections whenever there is a too sudden modification in the admission of fuel to the engine. To this end, the acceleration pedal controls the slider of a potentiometric voltage divider and a sudden shifting of said slider charges a condenser which prevents operation of the flip-flop. This is accomplished for by the application of a pulse by the transiently charged condenser to the base of a transistor which is thus rendered conductive and which grounds the input of the flip-flop through its collector-emitter circuit connected between said input and ground.

1 Claim, 1 Drawing Figure

PATENTED JUN 27 1972   3,672,345
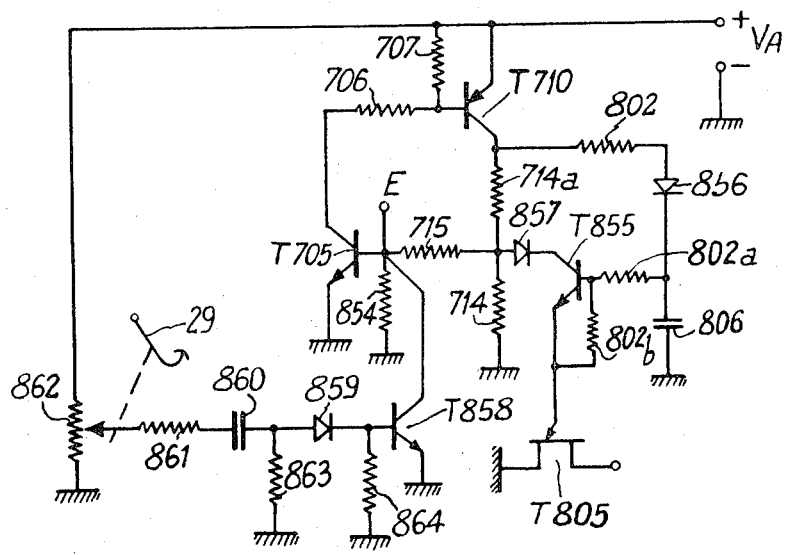
INVENTOR
LOUIS A. MONPETIT
BY
Kenyon & Kenyon Reilly Carr & Chapin
ATTORNEYS

ELECTRONIC INJECTION-CONTROLLING SYSTEM FOR INTERNAL COMBUSTION ENGINES

The present invention has for its object improvements in the electronic control of the injection in internal combustion engines for automobile vehicles.

The advantages of an electronic control of the injection are well known and various systems have already been proposed as prototypes or are already on the market.

Most known systems utilize controlling flip-flop circuit triggered by a signal produced by a pulse generator in synchronism with the rotation of the engine and adapted to start the injection, the duration of injection and consequently the amount of fuel injected being defined in accordance with the conditions of operation of the engine by means of delay circuit forming part of the flip-flop circuit or constituting an independent unit.

Such control circuits provide means for incorporating a number of engine operating parameters with the operation so that it is an easy matter to particularly take into account the necessity of reducing the pollution of the ambient air to a minimum.

In order to obtain such a minimum pollution of the ambient air it has been proposed to completely cut off the injection as soon as the pressure in the input manifold of the engine falls below a predetermined value, which low pressure is generally reached when the driver of the vehicle slows down suddenly so that the engine is driven by the vehicle wheels.

In order to still further improve the efficiency of such an arrangement in order to reduce the pollution of the air, it is advantageous to cut off the injection, even before the manifold pressure has reached the above-mentioned predetermined value. The present invention has as its object the provision of such an improved arrangement. More specifically, this invention is directed to an electronic control system for fuel injection in automobile internal combustion engines, wherein a pulse generator triggers a flip-flop in synchronism with the speed of rotation of the engine in order to start the electromagnetically controlled injection, said flip-flop being returned to its initial condition at the end of a period corresponding to the duration of injection while the speed of the vehicle and consequently that of the engine are adjusted by the driver through controlling means acting on the duration of injection. According to the invention said control means includes an electronic connection with said flip-flop for momentarily preventing any injection whenever the control means has been shifted at a speed above a predetermined value, whereby the duration of injection is reduced.

According to preferred embodiment of the invention, the control means is connected with the slider of a voltage-divider fed by a voltage supply while a condenser charged transiently by said slider when it has been shifted is connected with the base of a transistor which is rendered conductive during a predetermined period the length of which depends on the speed of movement of the slider, on the capacity of the condenser and on the resistances connected in the circuit for charging the condenser. The collector-emitter circuit of the transistor is connected in the flip-flop circuit so that it cannot be triggered by the signals defining the beginning of the injection as long as said transistor is conductive. The flip-flop is bistable and is triggered by a positive pulse for each injection. The collector of the injection-blocking transistor is connected with the input of said bistable flip-flop receiving the positive signals starting the injections and the emitter of said transistor is grounded. Said injection blocking transistor is rendered conductive by a transient positive voltage applied to its base through a diode and produced by the first-mentioned condenser connected with the slider of the voltage-divider through a resistance, the anode and cathode of said diode being both grounded through a resistance.

By way of example and in order to further the understanding of the following description, the accompanying drawings is a schematic diagram of the circuit for an electronic injection-control system according to the invention.

The single FIGURE of said drawing shows that the arrangement according to the invention cooperates with a bistable flip-flop and a delay circuit, which do not form part of the invention, but which will be described hereinafter in order to further the understanding of the operation of the complete circuit. It should be noted that the improved arrangement may be used both with a bistable flip-flop and with a monostable flip-flop.

The bistable flip-flop illustrated includes transistor T 705, of which the emitter-collector circuit is connected between the voltage supply $V_A$ and ground in series with resistances 706 and 707 and transistor T 710 similarly connected with resistances 714a and 714. The bases of transistor T 705 is connected with the point connecting said resistances 714a and 714 through resistance 715 while the base of transistor T 710 is connected directly with the point connecting resistances 707 and 706. The base of transistor T 705 is grounded through resistance 854. The flip-flop is triggered upon application of a positive pulse to the input E and it is turned off by a negative pulse from the delay circuit. The delay circuit comprises unijunction transistor T 805, transistor T 855, diodes 856 and 857, condenser 806 and resistances 802, 802a, 802b. When the flip-flop is triggered condenser 806 is charged with a time constant depending on its capacity and on the value of the resistance 802. At the end of a predetermined duration the voltage across the terminals of condenser 806 is such that the unijunction transistor T 805 suddenly becomes conductive and discharges said condenser 806 through the resistances 802a and 802b. Consequently, the voltage applied on the base of transistor T 855 rises above that applied on its emitter so that said transistor T 855 becomes conductive. At this moment the point connecting the resistances 714a, 714 and 715 is practically at zero voltage which results in cutting off transistor T 705 and returning of the bistable flip-flop to its initial state.

The control means according to the invention are adapted to prevent a triggered of the bistable flip-flop during a transient period. They include transistor T 858 the collector of which is connected with the input E of the bistable flip-flop while its emitter is directly grounded.

The base of said transistor T 858 is connected with the slider of a potentiometric voltage-divider 862 through diode 859, condenser 860 and resistance 861. The anode and cathode of the diode 859 are grounded through the resistances 863 and 864 respectively. A mechanical connection is provided between the slider of the voltage divider 862, connected between the voltage supply VA and ground with the means controlling the duration of injection constituted in the present case by the accelerator pedal 29. The position of said pedal 29 defines the duration of injection, for instance through a modification of the voltage applied to the base n°2 of the unijunction transistor T 805. When the pedal 29 is shifted in a direction increasing the input of gas through the throttle valve, the slider of the voltage divider 862 moves, for example, downwardly whereas the closing of said throttle valve produces an upward movement of said slider.

As long as said slider remains stationary in any given position the voltage applied to the base of the transistor T 858 is zero since said base is grounded through the resistance 864.

Now, if the driver speedily releases his pedal 29, the slider on the voltage-divider 862 moves upwardly and consequently a charging current passes through condenser 860 which ensures transiently during the charging of said condenser 860 a saturated condition for the transistor T 858. This results in the base of transistor T 705 being grounded through transistor T 858 and therefore transistor T 705 cannot be triggered any more by a pulse applied to the input E, since such a pulse is directly grounded throughout the period of saturation of the transistor T 858. Consequently, the bistable flip-flop cannot be triggered as long as transistor T 858 is saturated.

Through a suitable selection of the resistance 861 and of the condenser 860, it is possible to act on the duration of the transient cutting off of the injection and also on the speed of the shifting of the slider required for the system to become operative.

What I claim is:

1. In an electronically controlled fuel injection system for an internal combustion engine for driving a vehicle, the engine having a device for setting the power level of the engine between minimum and maximum power levels, the system comprising a pulse generator operatively connected with a rotatable shaft of the engine, a switching circuit activated by each pulse from the pulse generator to produce an injection signal which is applied to an electro-magnetic fuel injector including a multivibrator circuit which is released by a pulse applied to an input thereof, the duration of the injection signal determining the opening duration of the fuel injector and hence the quantity of fuel injected, and control means acting on the switching circuit for varying the duration of the injection signal according to the operating conditions of the engine, the improvement comprising a. means for providing a power signal in response to any predetermined incremental decrease in the setting of the engine power level device including a potentiometric voltage divider, a slider for said voltage divider positioned in response to the engine power level device, the predetermined incremental decrease being that between any greater and lesser power level setting in the range of power level settings of the device, and b. means connected to the switching circuit and responsive to the power signal for interrupting the operation of the switching circuit and thereby the fuel injection, including a condenser adapted to have its charge changed through the slider upon shifting of the latter, a resistance inserted between the condenser and the slider, a transistor the collector of which is connected with the multivibrator input and the emitter of which is grounded, a diode connecting the condenser with the base of the transistor, and resistances grounding the terminals of the diode, the transient pulses generated by a rapid shifting of the slider being applied to the base of the transistor, whereby the transistor grounds the multivibrator and renders it transiently inoperative.

* * * * *